United States Patent [19]

Tsujino et al.

[11] Patent Number: 5,164,223
[45] Date of Patent: Nov. 17, 1992

[54] PROCESS FOR PRODUCING LIGHT CONTROL PLATE

[75] Inventors: Toshifumi Tsujino; Hiroaki Yamamoto; Naoto Hirayama; Satoshi Ishizuka; Koichi Maeda, all of Osaka, Japan

[73] Assignees: Nippon Sheet Glass Co., Ltd.; Sumitomo Chemical Company, Limited, both of Osaka, Japan

[21] Appl. No.: 766,792

[22] Filed: Sep. 27, 1991

[30] Foreign Application Priority Data

Oct. 5, 1990 [JP] Japan ................... 2-267820

[51] Int. Cl.⁵ ........................ B05D 3/06
[52] U.S. Cl. ........................ 427/520; 427/164; 427/307; 427/430.1
[58] Field of Search ......... 427/54.1, 164, 307, 427/430.1

[56] References Cited

U.S. PATENT DOCUMENTS 3,565,780 2/1971 Zimmerman ............... 204/159.15

OTHER PUBLICATIONS

Patent Abstracts of Japan, 13(303) (P-896) (Dec. 14, 1987).
Patent Abstracts of Japan, 13(146) (P-854) (Apr. 11, 1989).
Patent Abstracts of Japan, 14(253) (P-1054) (May 30, 1990).
Patent Abstracts of Japan, 7(96) (P-1241) (Apr. 22, 1983).

*Primary Examiner*—Bernard Pianalto
*Attorney, Agent, or Firm*—Wenderoth, Lind & Ponack

[57] ABSTRACT

A process for producing a light control plate which selectively scatters incident light of a specific angle, which comprises:
(1) bringing at least one photopolymerizable compound of a photopolymerizable monomer and a photopolymerizable oligomer into contact with a transparent plastic film or sheet, each of the monomer and the oligomer having a polymerizable carbon-carbon double bond and being capable of forming a polymer having a refractive index different from a refractive index of said transparent plastic film or sheet, to allow said photopolymerizable compound to infiltrate into said transparent film or sheet through a surface of said transparent film or sheet, thereby forming a swollen surface layer, and
(2) irradiating the swollen surface layer with light from a linear light source at a predetermined angle to cure said swollen surface surface layer.

10 Claims, 3 Drawing Sheets

PROCESS FOR PRODUCING LIGHT CONTROL PLATE

DETAILED DESCRIPTION OF THE INVENTION

The present invention relates to a process for producing a light control plate which selectively scatters an incident light of a specific incident angle.

According to the proposal of the present inventors (Japanese Laid-Open Patent Publication No. 77,001/1989), it has been conventionally known that a light control plate which selectively scatters only incident light of a specific angle can be obtained from a photopolymerizable composition containing a compound having a polymerizable carbon-carbon double bond in the molecule by adjusting the conditions for polymerizing and curing the photopolymerizable composition.

Further, while a photopolymerizable composition comprising a uniform mixture of at least two monomers (or oligomers having a polymerizable carbon-carbon double bonds and being capable of forming polymers having different refractive indices, e.g. a uniform liquid monomer mixture comprising polyetherurethane acrylate, tribromophenoxyethyl acrylate and hydroxyisobutylphenone is maintained in the state of a filmy substance, a linear light source (rod-like ultraviolet lamp) is horizontally set at a vertical distance from a surface of the filmy substance, and the filmy substance is irradiated with ultraviolet light from the light source to cure it, whereby a light control film can be obtained. And, for example, the light control film, adhesive synthetic resin films such as an ethylene-vinyl acetate copolymer and glass sheets are stacked in the order of glass/synthetic resin film/light control film/synthetic resin film/glass, and the resultant laminate is treated under heat and pressure, whereby an integrated laminate can be obtained. Such a laminate works as a light control plate, and is commercially available as a visual field selection glass (Angle 21 ®, trade name, supplied by Applicant Company). Further, a laminate produced by stacking plastic films, adhesive layers and a light control film in the order of plastic/adhesive layer/light control film/adhesive layer/plastic is also commercially available as a visual field control plate (Lumisty ®, trade name, supplied by Sumitomo Chemical Co., Ltd.).

For practical use, in order to improve the light control plate in strength and weatherability, the light control plate is required to be used as a laminate of at least five layers in which the light control film is sealed and laminated between a pair of transparent glass or plastic sheets through an adhesive layer on each side of the light control film.

It is an object of the present invention to provide a novel process for producing a light control plate.

It is another object of the present invention to provide a process for producing a light control plate industrially with ease and at a low cost.

It is further another object of the present invention to provide a process for producing a light control plate which is formed of a laminate having less than five layers, e.g. three layers, but which has performances fully comparable to those of light control plates rated high in practical use.

The other objects and advantages of the present invention will be apparent from the following description.

According to the present invention, the above objects and advantages of the present invention are achieved by a process for producing a light control plate which selectively scatters incident light of a specific angle, which comprises:

(1) bringing at least one photopolymerizable compound of a photopolymerizable monomer and a photopolymerizable oligomer into contact with a transparent plastic film or sheet, each of the monomer and oligomer having a polymerizable carbon-carbon double bond and being capable of forming a polymer having a refractive index different from that of said transparent plastic film or sheet, to allow said photopolymerizable compound to infiltrate into said transparent film or sheet through a surface of said transparent film or sheet, thereby forming a swollen surface layer, and (2) irradiating the swollen surface layer with light from a linear light source at a predetermined angle to cure said swollen surface layer.

BRIEF AND DETAILED DESCRIPTION OF THE DRAWINGS

FIG. 1 shows light irradiation in which a plastic sheet 3 having a surface layer 2 swollen due to a photopolymerizable compound is irradiated with light from a linear light source 1.

FIG. 2 shows a relationship between an incident angle and a haze (%) with respect to a light control plate produced by the irradiation of a plastic sheet having a surface layer swollen due to a photopolymerizable compound with light from a linear light source.

FIGS. 3 and 4 respectively show relationships between an incident angle and a haze (%) with respect to other light control plates.

Figure 1:
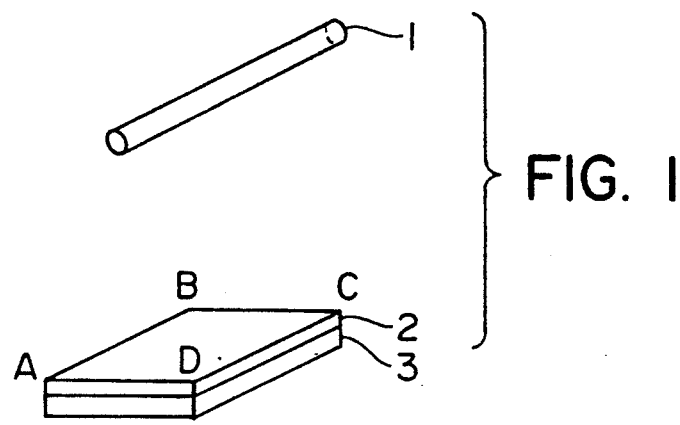

The present invention will be detailed hereinafter.

The photopolymerizable compound used in the present invention is either a photopolymerizable monomer or a photopolymerizable oligomer, each of which has at least one polymerizable carbon-carbon double bond in the molecule and can form a polymer having a refractive index different from that of a plastic sheet or film to be described later, or is a mixture of the above photopolymerizable monomer with the above photopolymerizable oligomer.

The above photopolymerizable compound is advantageously selected from compounds which give a polymer having a refractive index being different from that of a plastic sheet or film to be described later preferably by at least 0.01, more preferably by at least 0.02.

As the polymerizable carbon-carbon double bond to be contained in the photopolymerizable compound, there may be mentioned, for example, acryloyl, methacryloyl, vinyl and allyl groups.

The carbon-carbon double bonds of the above groups are cleavable and polymerizable with an active radical species or under irradiation with light, e.g. ultraviolet light.

Examples of the photopolymerizable monomer include, for example, monofunctional acrylates such as methyl acrylate, tetrahydrofurfuryl acrylate, ethylcarbitol acrylate, dicyclopentenyloxyethyl acrylate, isobornyl acrylate, phenylcarbitol acrylate, nonylphenoxyethyl acrylate, 2-hydroxy-3-phenoxypropyl acrylate, ω-hydroxyhexanolyloxyethyl acrylate, acryloyloxyethyl succinate, acryloyloxyethyl phthalate, phenyl acrylate, tribromophenyl acrylate, phenoxyethyl acrylate, tribromophenoxyethyl acrylate, tribromophenoxypolyethylene glycol acrylate, benzyl acrylate, p-bromobenzyl acrylate, 2-ethylhexyl acrylate, lauryl acrylate and 2,2,3,3-tetrafluoropropyl acrylate and monofunctional methacrylates corresponding to these; polyfunctional acrylates such as bisphenol A diacrylate and 2,2-bis(4-acryloxyethoxy-3,5-dibromophenyl)propane and polyfunctional methacrylates corresponding to these; vinyl compounds such as vinyl benzoate, styrene, p-chlorostyrene, divinylbenzene, vinyl acetate, acrylonitrile, N-vinylpyrrolidone and vinylnaphthalene; and allyl compounds such as diethylene glycol bisallylcarbonate, diallylidenepentaerythritol, triallylisocyanurate, diallyl phthalate and diallyl isophthalate.

Examples of the photopolymerizable oligomer are, for example, polyester acrylate, polyol polyacrylate, modified polyol polyacrylate, polyacrylate having an isocyanuric acid skeleton, melamine acrylate, polyacrylate having a hydantoin skeleton, polybutadiene acrylate, epoxy acrylate and urethane acrylate.

The above photopolymerizable monomers and photopolymerizable oligomers may be used alone or in combination as a mixture of monomers or oligomers or as a mixture of monomer(s) with oligomer(s).

The photopolymerizable compound may be applied directly to a plastic film or sheet, or may be applied thereto after it is diluted with a solvent.

The above solvent is selected, for example, from organic solvents such as toluene, n-hexane, cyclohexane, methyl alcohol, ethyl alcohol, acetone, methyl ethyl ketone, tetrahydrofuran, ethyl acetate, dimethylformamide, dimethylacetamide and acetonitrile.

The photopolymerizable compound may contain a photopolymerization initiator, as required. The photopolymerization initiator is selected, for example, from benzophenone, benzyl, Michler's ketone, 2-chlorothioxanthone, 2,4-diethylthioxanthone, benzoin ethyl ether, diethoxyacetophenone, benzyl dimethyl ketal, hydroxyisobutylphenone and 1-hydroxycyclohexyl phenyl ketone. The amount of the photopolymerization initiator for use is generally 0.1 to 10% by weight based on the photopolymerizable compound, although it varies depending upon the kind of the photopolymerizable compound.

The above plastic film or sheet used in the present invention refers to a film or sheet having transparency (colorless or colored) which is formed of a thermoplastic resin or a resin having a three-dimensionally crosslinked structure. That is, even a resin having a three-dimensionally crosslinked structure may be used if the photopolymerizable compound can infiltrate into the film or sheet through the film or sheet surface.

The above thermoplastic resin and the above resin having a three-dimensionally crosslinked structure are preferably selected, for example, from polymethyl methacrylate, polycarbonate, polyvinyl chloride, polyethylene terephthalate, diacetyl cellulose, triacetyl cellulose, polystyrene, polyvinyl butyral, polyurethane, ethylene/vinyl acetate copolymer, silicone rubber and polymers of the aforespecified photopolymerizable monomers or oligomers.

These resins may contain a variety of stabilizers or light absorbents as required, and the resultant composition is molded into the above plastic film or sheet.

The plastic film or sheet preferably has a thickness, for example, of 0.2 to 10 mm. When polymethyl methacrylate is used to form the plastic film or sheet, the surface layer formed by the infiltration of the photopolymerizable compound is sometimes too soft and is difficult to handle. For this reason, it is preferred to incorporate 0.1 to 20% by weight of a crosslinking agent into a film or sheet-forming material in advance in order to impart the surface layer with suitable hardness.

Preferred examples of combination of the plastic film or sheet with the photopolymerizable compound are as follows: A combination of polymethyl methacrylate (refractive index=about 1.490) with a methyl methacrylate/vinyl benzoate mixture (refractive index=about 1.532 as a copolymer), a combination of a polymethyl methacrylate (refractive index=about 1.490) with a methyl methacrylate/benzyl acrylate mixture (refractive index=about 1.529 as a copolymer), and combination of polyetherurethane acrylate (refractive index=about 1.493) with phenoxyethyl acrylate (refractive index=about 1.557 as a polymer).

In the present invention, for forming a surface layer swollen with the photopolymerizable compound on the plastic film or sheet, the photopolymerizable compound is brought into contact with the plastic film or sheet, for example, according to a method in which the plastic film or sheet is immersed in the above photopolymerizable compound or to a method in which a surface of the plastic film or sheet is coated with the above photopolymerizable compound. After the photopolymerizable compound has been brought into contact with the plastic film or sheet, the photopolymerizable compound and the plastic film or sheet may be heated up to at temperature between 40° C. and 150° C. as required, whereby the formation of a swollen layer is accelerated. The swollen layer preferably has a thickness of at least 25 μm, more preferably 100 μm or greater. Further, it is advantageous to adjust the thickness of the swollen layer to not more than 50% of the thickness of the plastic film or sheet.

The contact time is generally 10 minutes to 10 hours.

It is considered that the above swollen layer has a state in which the monomer or oligomer of the above photopolymerizable compound has infiltrated into the plastic film or sheet and is present in spaces of the polymer structure constituting the plastic film or sheet.

According to the present invention, the swollen layer formed in the above manner is then irradiated with light from a linear light source at a predetermined angle, whereby the swollen layer is cured.

The light source used in the present invention emits ultraviolet light or other actinic radiation which contributes to the photopolymerization of the photopolymerizable compound in the film or sheet. The light source has a linear form as viewed from the irradiated position (film or sheet surface). When viewed from the irradiated position, the light source preferably has a size, as a visual angle A in the direction of its major axis, of at least 8°, more preferably at least 12°. And, the size of the light source as a visual angle B in the direction of its minor axis is preferably at most A/4, more preferably at most A/10. A rod-like ultraviolet lamp is preferred as a linear light source in the present invention. In addition to such a linear light source, there can be also used a light source which apparently looks linear when viewed from the irradiated position, such as an apparently linear arrangement of many point light sources or a device using a rotating mirror and a convex mirror for scanning film or sheet surface (irradiation of one point in the irradiated position from many different angles) with a laser light, etc.

When ultraviolet light is used for the irradiation, for example, a mercury lamp or a metal halide lamp is preferred as a rod-like ultraviolet lamp in view of ease in handling.

The plastic film or sheet with the swollen layer that is positioned upward or downward is irradiated at a predetermined angle with light from a linear light source, whereby the swollen layer of the plastic film or sheet is polymerized. As a result, there can be obtained a light control plate which shows anisotropy with regard to the directions of the major axis and minor axis of the linear light source and scatters light of a specific angle only when rotated about the axis along the major axis direction of the light source.

The mechanism of the formation of the above light control plate which scatters light of a specific angle is considered as follows. For example, the swollen layer is formed on the surface of the plastic film or sheet formed of a polymer A (which assumedly has a low refractive index) by the infiltration of a monomer or oligomer B (to give a polymer B which assumedly has a high refractive index). When the swollen layer surface is irradiated at a predetermined angle with light from a linear light source, a light intensity distribution is microscopically formed in the vicinity of the swollen layer surface, and the polymerization of the monomer or oligomer B starts in a portion under a higher light intensity. The monomer or oligomer B in a portion under a lower light intensity is diffused and moved to the portion under a higher light intensity, and the concentration of the polymer B in the portion under a higher light intensity increases. With this process, the structure of the polymer A which has been originally present is partly moved or shifted from the portion under a higher light intensity to the portion under a lower light intensity. As a result, when the polymerization is completed, the concentration of the polymer B in the portion under a higher light intensity is high (the concentration of the polymer A is low), and on the other hand, the concentration of the polymer A in the portion under a lower light intensity is high (the concentration of the polymer B is low). The polymer B has been assumed to have a higher refractive index than the polymer A. Therefore, on the plastic film or sheet surface is formed a microstructure in which portions having a higher refractive index (portions irradiated with light having a higher light intensity) and portions having a lower refractive index (portions irradiated with light having a lower light intensity) are repeatedly formed.

The microscopic observation of the above-formed microstructure shows that it is nearly the same as the microstructure of the light control plate disclosed in Japanese Laid-Open Patent Publication No. 77001/1989.

According to the present invention, a light control plate having a light control function in the surface layer of a plastic substrate can be produced industrially advantageously and at a low cost. Differing from conventional light control plates, the light control plate obtained according to the present invention does not require a five-layer laminate, and practical light control can be achieved with a one-layered laminate. When the light control plate is used in a severe environment, a light control plate having sufficient weatherability can be obtained by forming a protective layer on that surface of the light control plate which has a light control function, or by preparing a three-layered laminate in which a plastic film or glass is stacked on said surface through an adhesive layer.

The present invention will be explained further in detail hereinafter by reference to Examples. However, the present invention shall not be limited to these Examples. In Examples, "part" stands for "part by weight".

EXAMPLE 1

A composition containing 100 parts of a methyl methacrylate monomer, 1.2 parts of tert-butylperoxypivalate, 0.6 part of tert-butylperoxyisopropylcarbonate and 2.5 parts of nonaethylene glycol diacrylate was polymerized by thermal polymerization to obtain a polymethyl methacrylate sheet having a size of 10 cm × 10 cm and a thickness of 3 mm (refractive index = about 1.490).

The above-obtained sheet was immersed in a solution mixture containing 50 parts of a methyl methacrylate monomer, 50 parts of vinyl benzoate and 3 part of hydroxyisobutylphenone (refractive index of the copolymer = about 1.532) at an ambient temperature of 50° C. for 2 hours, and taken out. The surface layers of the sheet which were about 300 μm deep were swollen until these layers were about 600 μm deep.

As shown in FIG. 1, the above swollen sheet 3 was horizontally placed, and a rod-like high-pressure mercury lamp having an intensity of 80 W/cm and a lamp length of 25 cm was horizontally set right above the sheet at a distance of 50 cm from the sheet such that the lamp was positioned in parallel with the side AB of the sheet. Then, the swollen surface layer 2 of the sheet 3 was irradiated with ultraviolet light for about 5 minutes to photo-cure the surface layer.

Figure 2:
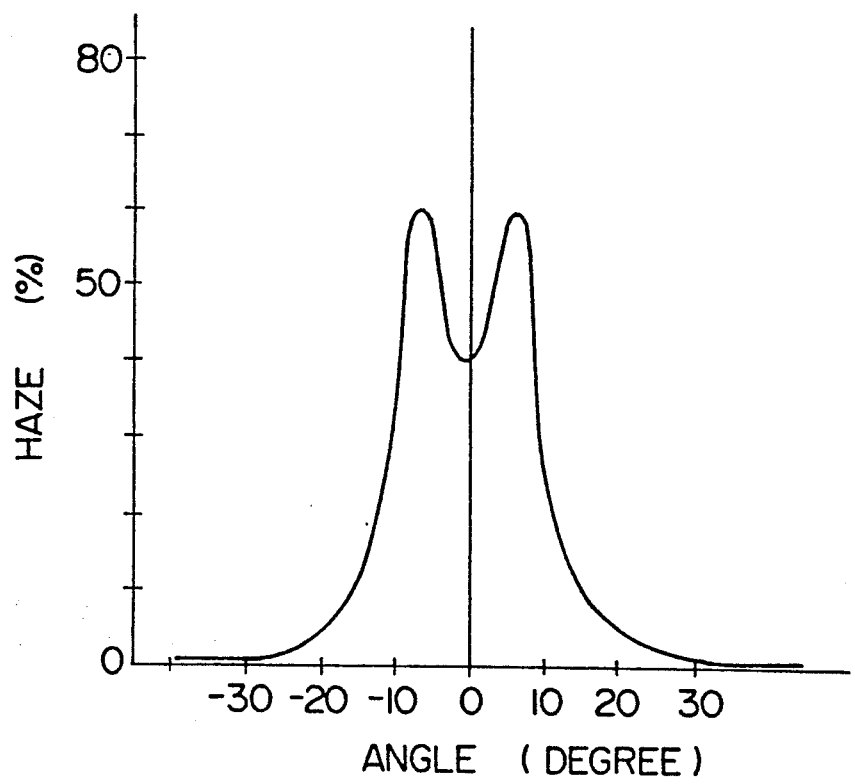

The resultant light control plate was measured for a total light transmittance and a scattered light transmittance with an integrating-sphere-method light transmittance-measuring apparatus according to JIS K-6714, and its haze was determined. That is, while the light control plate was tilted about the axis in parallel with the side AB of the plate to direct light from the direction at right angles with respect to the side AB, and while the angle between incident light and the light control plate was changed, the above haze was determined. FIG. 2 shows a change in haze with regard to incident angles (incidence at right angles = incident angle of 0).

EXAMPLE 2

Figure 3:
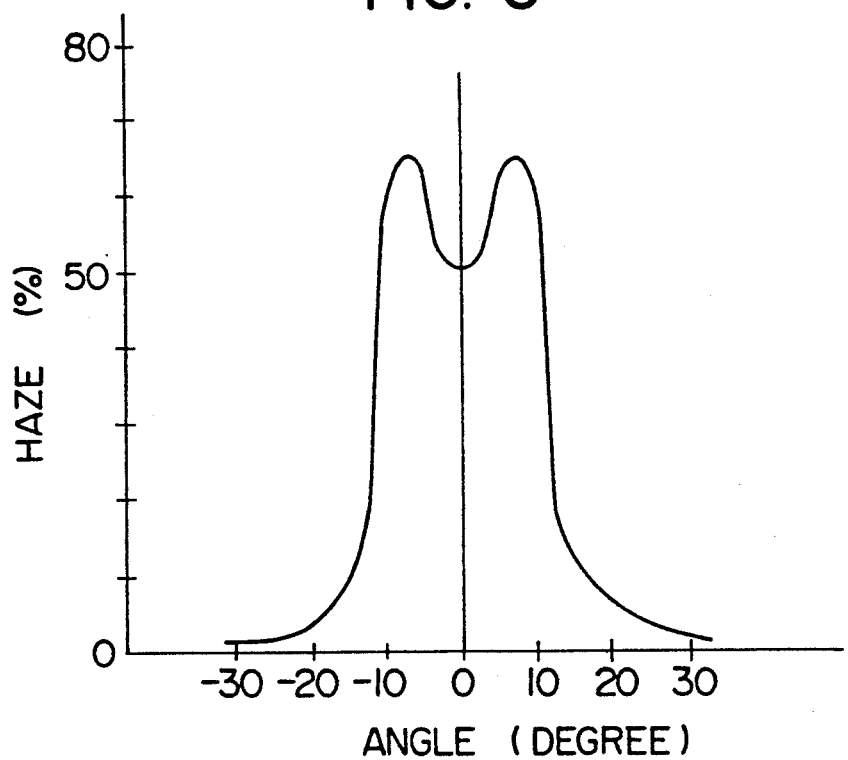

Example 1 was repeated except that the solution mixture was replaced with a solution mixture containing 50 parts of a methyl methacrylate monomer, 50 parts of benzyl acrylate and 3 parts of hydroxyisobutylphenone (a refractive index of the copolymer = about 1.529), whereby a light control plate was obtained. FIG. 3 shows a change in haze of the obtained light control plate with regard to incident angles.

EXAMPLE 3

Figure 4:
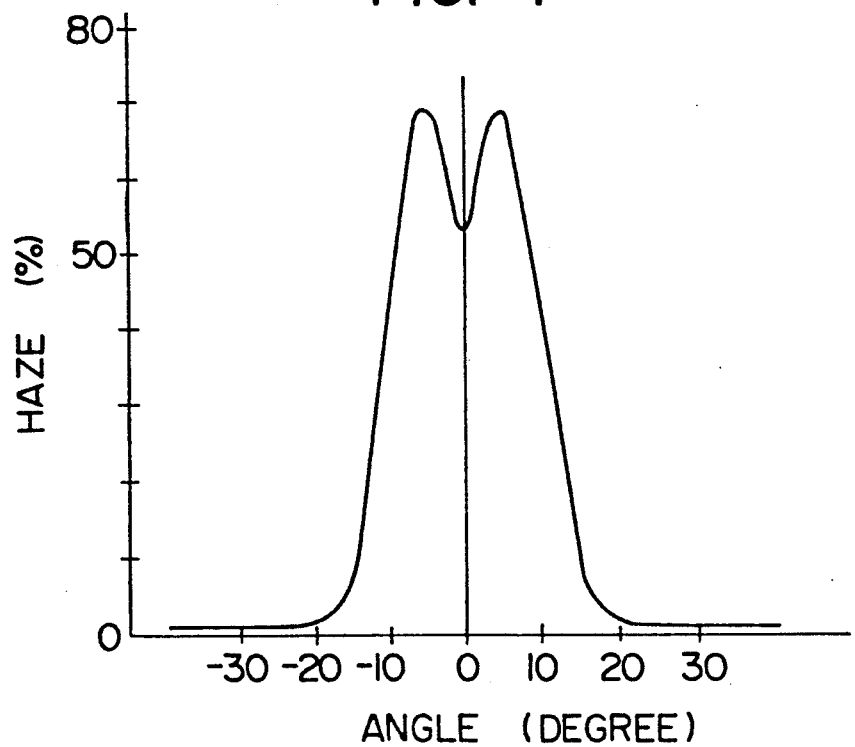

A composition was prepared by adding 3 parts of hydroxyisobutylphenone to 100 parts of polyetherurethane acrylate (refractive index of the polymer = 1.493) obtained by a reaction of polytetramethylene ether glycol having a number average molecular weight of 2,000 with toluene diisocyanate and 2-hydroxyethyl acrylate. The resultant composition was cast on a glass plate to form a filmy substance having a thickness of 500μ. The filmy substance was polymerized by irradiation with ultraviolet light from a rod-like high-pressure mercury lamp to give a transparent film. The film was immersed in a solution containing 100 parts of phenoxyethyl acrylate and 3 parts of hydroxyisobutylphenone (refractive index of the polymer=1.557) at an ambient temperature of 50° C. for 1 hour to swell the film. Thereafter, the resultant swollen film was photo-cured in the same manner as in Example 1 to give a light control plate. FIG. 4 shows a change in haze of the obtained light control plate with regard to incident angles.

EXAMPLE 4

One surface of a polyvinyl butyral sheet for laminated glass (760 μm, refractive index=about 1,49, supplied by Sekisui Chemical Co., Ltd) was coated with a mixture solution containing 50 parts of a phenoxyethyl acrylate monomer (refractive index of the polymer=about 1.557), 3 parts of hydroxyisobutylphenone and 50 parts of methyl ethyl ketone with a 0.2 mm-gapped blade, and the resultant coating was dried at 50° C. for 5 minutes. As a result, the phenoxyethyl acrylate monomer and the hydroxyisobutylphenone was dispersed into sheet, and the methyl ethyl ketone was evaporated. And, there was formed a swollen layer having a depth of about 100 μm.

As shown in FIG. 1, the polyvinyl butyral sheet 3 having the above swollen layer was horizontally placed, and a rod-like high pressure mercury lamp 1 having an intensity of 80 W/cm and a lamp length of 25 cm was horizontally set right above the sheet at a distance of 50 cm from the sheet such that the lamp was positioned in parallel with the side AB of the sheet. Then, the swollen surface layer 2 of the sheet 3 was irradiated with ultraviolet light for about 5 minutes to photo-cure the surface layer. Thus, a penetration-resistant plastic sheet having a light control function was obtained.

Figure 5:
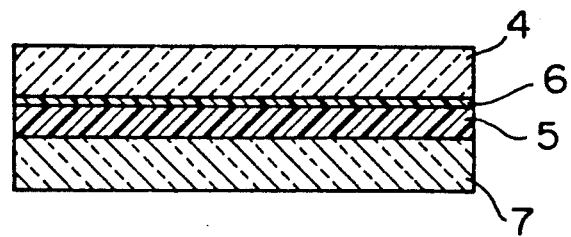
FIG. 5 depicts the order of layers in a laminated glass light control panel produced by the present process.
Figure 6:
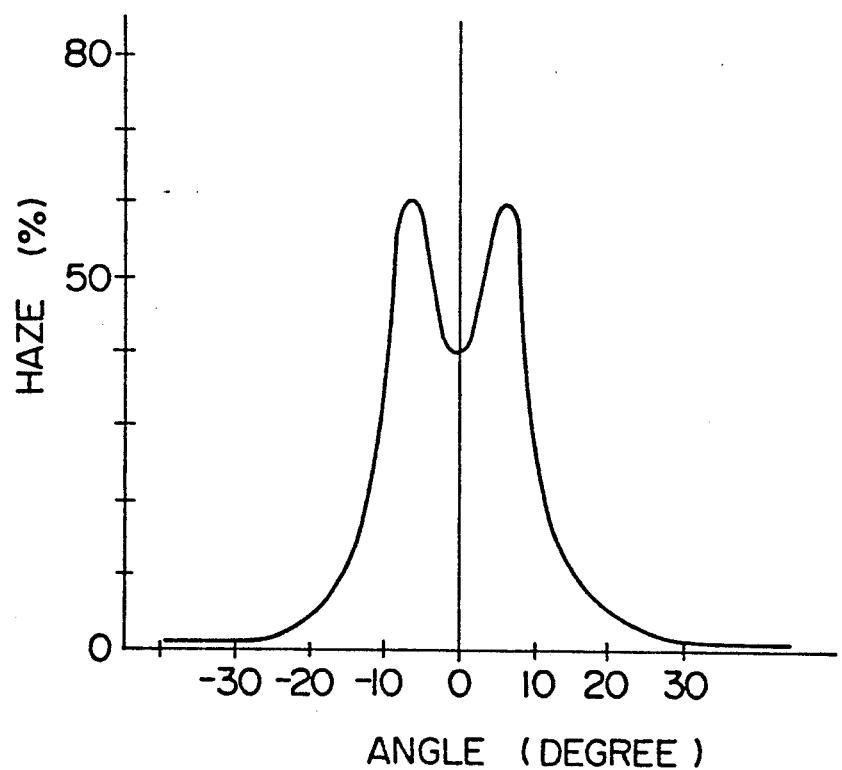
FIG. 6 shows the relationship between an incident angle and haze (%) with respect to the laminated glass light control panel of FIG. 5.

The above-obtained light control sheet was placed between two glass sheets having a thickness of 2.1 mm, and the resultant plate was treated in a vacuum bag having a vacuum degree of not higher than 10 mmHg for 30 minutes. Thereafter, the vacuum bag with the plate in it under vacuum was placed in an autoclave, and treated at 130° C. for 25 minutes at a pressure of 10 kg/cm$^2$ to give a laminated glass plate in which an inorganic glass layer 4, the polyvinyl butyral sheet 5 having the swollen surface layer 6 and an inorganic glass layer 7 were stacked in this order as shown in FIG. 5. The laminated glass plate showed dependency of its haze on incident angles as shown in FIG. 6. The laminated glass plate was also measured for physical properties to show excellent resistance to penetration. It showed no change from its initial state in appearance after the test on weatherability.

What is claimed is:

1. A process for producing a light control plate which selectively scatters incident light of a specific angle, which comprises:
   (1) bringing at least one photopolymerizable compound of a photopolymerizable monomer and a photopolymerizable oligomer into contact with a transparent plastic film or sheet, each of the monomer and the oligomer having a polymerizable carbon-carbon double bond and being capable of forming a polymer having a refractive index different from a refractive index of said transparent plastic film or sheet, to allow said photopolymerizable compound to infiltrate into said transparent film or sheet through a surface of said transparent film or sheet, thereby forming a swollen surface layer, and
   (2) irradiating the swollen surface layer with light from a linear light source at a predetermined angle to cure said swollen surface layer.

2. The process of claim 1, wherein the plastic film or sheet is formed of a thermoplastic resin or a resin having a three-dimensionally crosslinked structure.

3. The process of claim 1, wherein the plastic film or sheet is selected from the group consisting of polymethyl methacrylate, polycarbonate, polyvinyl chloride, polyethylene terephthalate, diacetyl cellulose, triacetyl cellulose, polystyrene, polyvinyl butyral, polyurethane, ethylene/vinyl acetate copolymer, silicone rubber and a polymer of a photopolymerizable compound.

4. The process of claim 1, wherein the polymer from the photopolymerizable monomer has a refractive index which is different from that of the plastic film or sheet by at least 0.01.

5. The process of claim 1, wherein the photopolymerizable monomer has, as a polymerizable carbon-carbon double bond, a group selected from the group consisting of acryloyl, methacryloyl, vinyl and allyl groups.

6. The process of claim 1, wherein the photopolymerizable oligomer is selected from the group consisting of polyester acrylate, polyol polyacrylate, modified polyol polyacrylate, polyacrylate having an isocyanuric acid skeleton, melamine acrylate, polyacrylate having a hydantoin skeleton, polybutadiene acrylate, epoxy acrylate and urethane acrylate.

7. The process of claim 1, wherein the photopolymerizable compound is brought into contact with the transparent plastic film or sheet by immersing the transparent plastic sheet or film in the photopolymerizable compound or by coating said film or sheet with the photopolymerizable compound.

8. The process of claim 1, wherein the swollen surface layer has a thickness of at least 25 μm.

9. The process of claim 1, wherein the linear light source as viewed from an irradiated position on the swollen surface layer has a size, as a visual angle A in the direction of its major axis, of at least 8°.

10. The process of claim 1, wherein the light source as viewed from an irradiated position on the swollen surface layer has a size, as a visual angle B in the direction of its minor axis, or up to A/4.

* * * * *